(12) United States Patent
Torres et al.

(10) Patent No.: US 9,308,815 B2
(45) Date of Patent: Apr. 12, 2016

(54) FUEL CAP LOCK

(71) Applicants: Armando Torres, Fontana, CA (US); Juan Carlos Torres, Fontana, CA (US)

(72) Inventors: Armando Torres, Fontana, CA (US); Juan Carlos Torres, Fontana, CA (US)

(*) Notice: Subject to any disclaimer, the term of this patent is extended or adjusted under 35 U.S.C. 154(b) by 0 days.

(21) Appl. No.: 14/609,373

(22) Filed: Jan. 29, 2015

(65) Prior Publication Data

US 2015/0217637 A1  Aug. 6, 2015

Related U.S. Application Data

(60) Provisional application No. 61/933,093, filed on Jan. 29, 2014.

(51) Int. Cl.
*B60K 15/04* (2006.01)
*E05B 83/34* (2014.01)
*E05B 17/18* (2006.01)

(52) U.S. Cl.
CPC ............ *B60K 15/0409* (2013.01); *E05B 17/183* (2013.01); *E05B 83/34* (2013.01); *B60Y 2200/14* (2013.01); *Y10T 70/5562* (2015.04)

(58) Field of Classification Search
CPC ..... E05B 83/34; E05B 17/183; Y10S 220/33; Y10T 70/554
USPC .............. 70/2, 6–8, 158–163, 164, 166–169, 70/177–179, 232; 141/98, 370; 220/86.2
See application file for complete search history.

(56) References Cited

U.S. PATENT DOCUMENTS

| | | | | |
|---|---|---|---|---|
| 1,037,814 | A * | 9/1912 | Whitney | 301/108.1 |
| 1,444,379 | A * | 2/1923 | Jones | 70/202 |
| 1,714,856 | A * | 5/1929 | Douglas | 70/177 |
| 1,989,300 | A * | 1/1935 | Webb | 220/86.2 |
| 2,377,036 | A * | 5/1945 | Quarfoot | 70/178 |
| 2,529,432 | A * | 11/1950 | Tenner | 70/232 |
| 3,930,388 | A * | 1/1976 | Barras | 70/159 |
| 3,945,227 | A * | 3/1976 | Reiland | 70/58 |
| 4,030,628 | A * | 6/1977 | Hippert, Jr. | 220/728 |
| 4,335,909 | A * | 6/1982 | Schmitz, Jr. | 292/5 |
| 4,556,187 | A * | 12/1985 | McLin | 248/503 |
| 4,613,055 | A * | 9/1986 | Connors | 220/210 |
| 5,052,198 | A * | 10/1991 | Watts | 70/58 |
| 5,076,531 | A * | 12/1991 | Delaney | 248/552 |
| 5,402,835 | A * | 4/1995 | Middleton | 141/331 |
| 5,515,634 | A * | 5/1996 | Kong | 42/70.11 |
| 5,732,575 | A * | 3/1998 | Kaveney | 70/2 |
| 5,775,139 | A * | 7/1998 | Sellers | 70/14 |
| 5,826,853 | A * | 10/1998 | Anello et al. | 248/552 |
| 5,987,936 | A * | 11/1999 | Hartman, Jr. | 70/2 |
| 6,520,405 | B1 * | 2/2003 | Braxter | 232/45 |
| 6,691,732 | B2 * | 2/2004 | Fleury, Jr. | 137/296 |
| 6,868,874 | B2 * | 3/2005 | Klein et al. | 141/98 |
| 7,389,551 | B2 * | 6/2008 | Stebner | 4/503 |
| 8,353,309 | B1 * | 1/2013 | Embry et al. | 137/385 |
| 8,800,331 | B1 * | 8/2014 | Sofianos | 70/164 |

* cited by examiner

*Primary Examiner* — Suzanne Barrett
(74) *Attorney, Agent, or Firm* — Ruth Eure

(57) ABSTRACT

A fuel cap lock comprising a base plate having a circular opening to accommodate the a diesel fuel tank fill pipe, two steel hinges mounted to vertical hinge supports welded to opposing sides base plate, a two strap hasp lock is hingedly mounted to the vertical hinge supports, wherein the hasp straps overlap, and lock together over a fuel tank's fuel cap, thus securing the cap and preventing its removal.

12 Claims, 2 Drawing Sheets

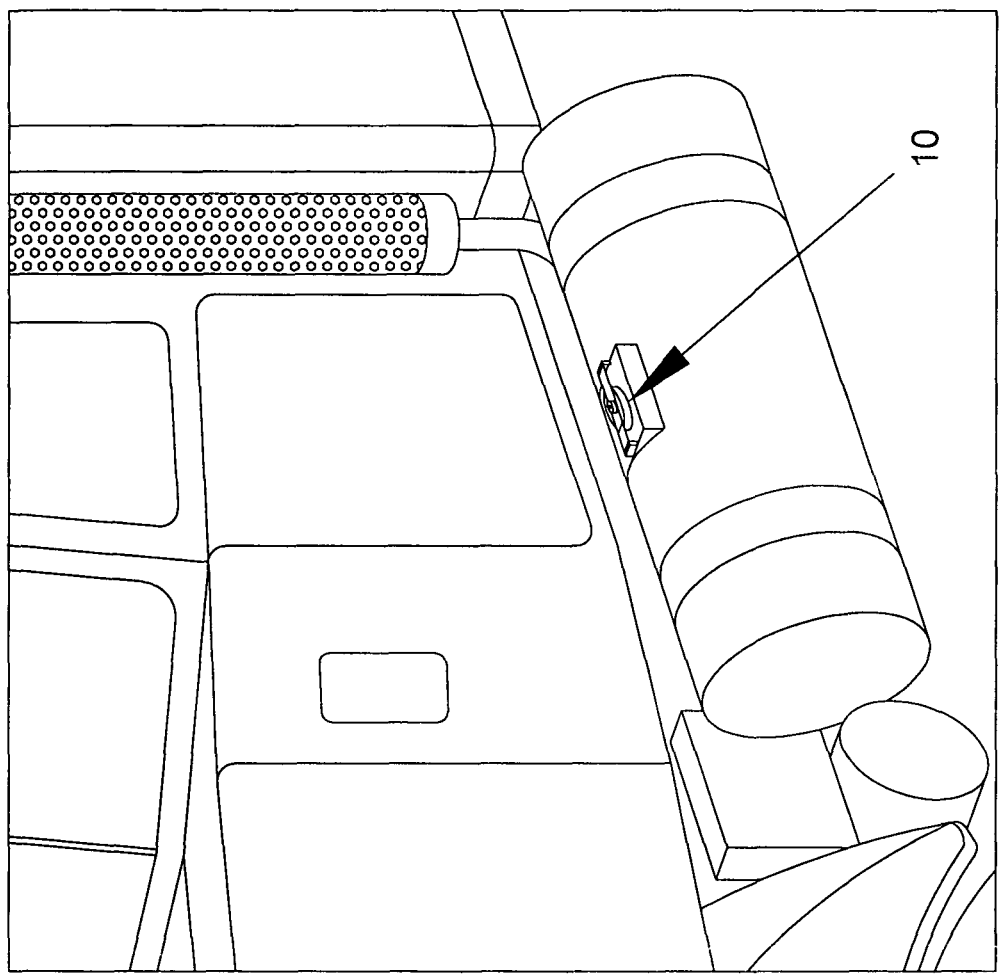

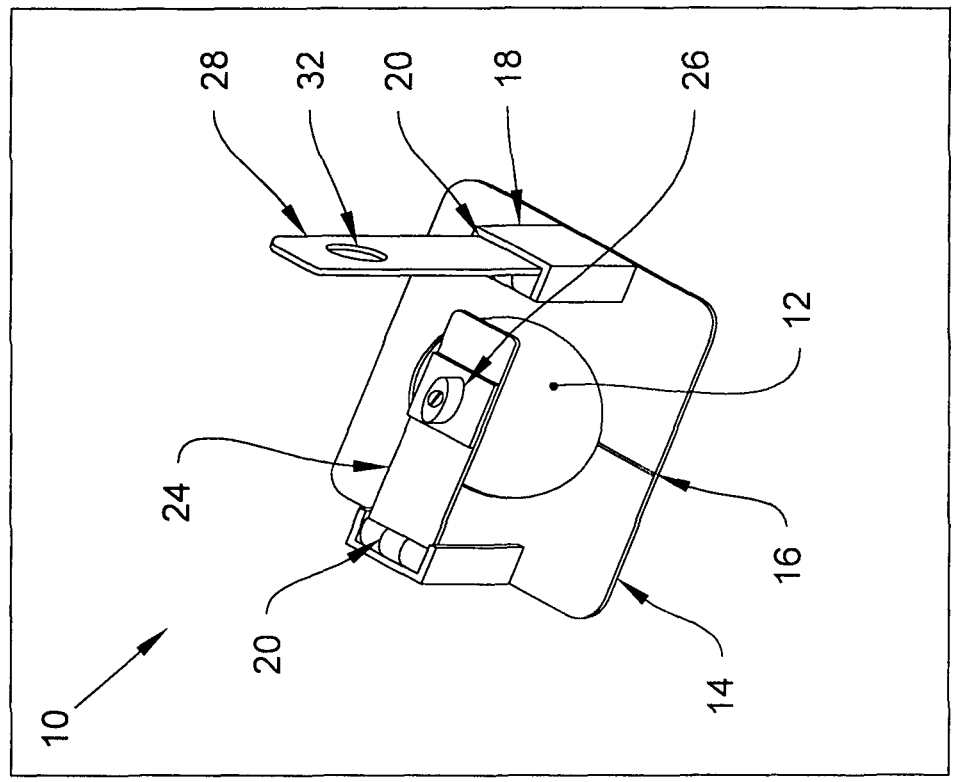
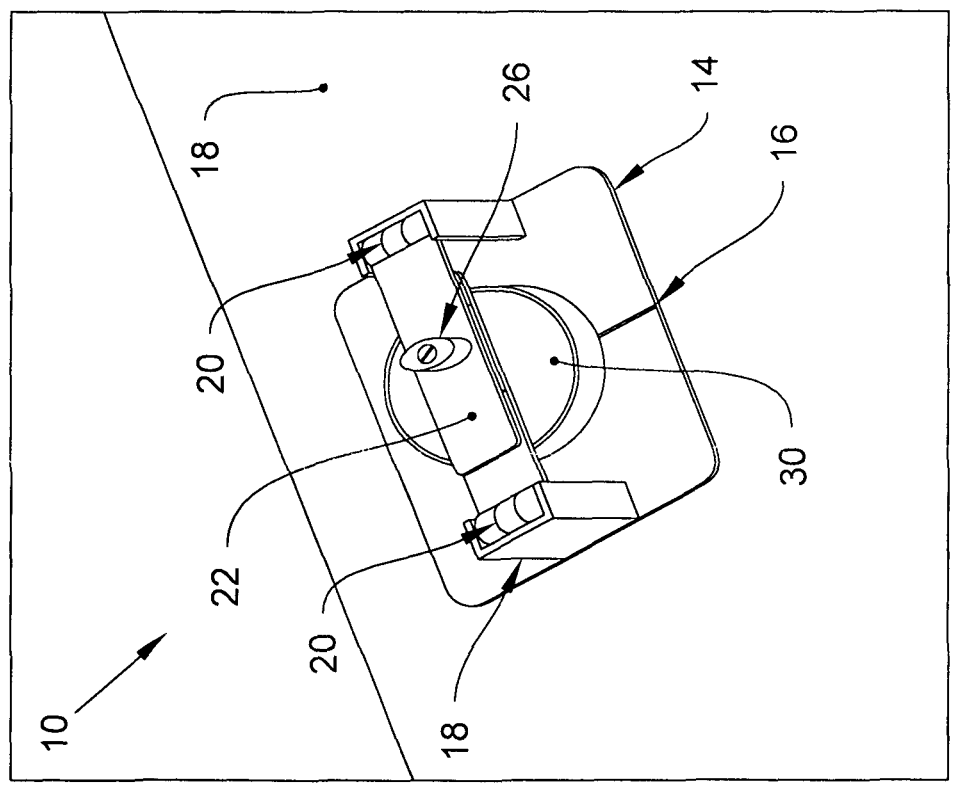

FUEL CAP LOCK

CLAIM OF PRIORITY

This patent application claims priority under 35 USC 119 (e) (1) from U.S. Provisional Patent Application Ser. No. 61/933,093 filed Jan. 29, 2014, of Armando Torres herewith entitled, "Fuel Cap Lock," which is incorporated herein by reference as though the same were set forth in its entirety.

FIELD OF THE INVENTION

The present invention relates generally to the field of automotive accessories, and more specifically to the field of automotive locks and more specifically relates to a fuel cap lock.

BACKGROUND OF THE INVENTION

Almost all of us today rely upon a vast network of individuals to bring us the essentials of life, from the water that runs from our taps to the electricity that powers our refrigerators, to the milk on the top shelf. But few of us know much about, or ever stop to consider, the complicated networks of production, transport, and distribution which stretch invisibly between ourselves as consumers and the people who harvest and supply the products, goods, and services upon which we depend. It seldom occurs to us, for example, that the milk on the top shelf in our refrigerator in suburban Virginia may be the final output of a complex system which begins with a dairy farm in Maryland or Pennsylvania, moves on to a pasteurizing and packaging plant in Delaware, then radiates up and down the East Coast via refrigerated trucks, the Interstate highway arteries, and a spoked, nodal system of refrigerated distribution and delivery centers. Because they are really separate worlds unto themselves, the great and overarching systems which supply us with clean water, abundant electricity, and an endless flow of goods and services are likely to remain a mystery to us.

Much of the transporting is done via tractor trailer units. These tractor trailer units use and store a lot of valuable fuel which thieves may wish to abscond with. It is desirable that a secure locking means be provided to prevent theft of such fuels.

Various attempts have been made to solve problems found in locking fuel cap means art. Among these are:

U.S. Pat. No. 1,944,535 to E. E. White et al describes a cap locking device comprising a structure including two principal members, one a stationary part to be positively secured to a filling tube, and the other a movable part forming a cap for such tube.

U.S. Pat. No. 4,613,055 to Arthur F. Connors describes a fuel tank cap cover comprising a base ring secured by a hinge to an annular cover. A pair of cooperating lugs secured to the base ring and to the annular cover, respectively, are provided with aligned holes therein for passage of a padlock which locks the cap cover thereby preventing theft of fuel from the tank.

U.S. Pat. No. 4,254,888 to James D. Chandler describes a locking gas tank cap comprising a main body having a first and second hinging portion. The first and second hinging portions are hingedly connected with each other and have corresponding mating surfaces surrounding a depression whereby when the mating surfaces are in contact the depressions form a cavity. The cavity completely encompasses the cap and a portion of the spout including a split ring that firmly engages the spout. The split ring being firmly attached to the spout and within the cavity prevents a thief from pulling up on the main body to frictionally engage and twist the cap off by engaging the inside edge of an inwardly extending flange of the main body while the main body is being rotated. The cavity is also tall enough to prevent a thief from pushing down to frictionally engage the cap with the main body. A lock securely holds the first and second hinging portions in a closed position.

None of the above inventions and patents, taken either singly or in combination, is seen to describe the invention as claimed. Thus, a need exists for a reliable fuel cap lock to avoid the above-mentioned problems.

BRIEF SUMMARY OF THE INVENTION

In view of the foregoing disadvantages inherent in the known locks art, the present invention provides a novel heavy-duty locking system designed for the diesel-tank caps of semi tractors.

It is an object of the present invention to secure a trucker's fuel supply against theft, through the use of a highly visible, heavy-duty lock. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, fuel cap lock, constructed and operative according to the teachings of the present invention.

FIG. 1 shows a perspective view illustrating a fuel cap lock in an in-use condition according to an embodiment of the present invention.

FIG. 2 is a top perspective view illustrating the fuel cap lock according to an embodiment of the present invention showing the device in place on a fuel tank spout and cap.

FIG. 3 is another perspective view illustrating the fuel cap lock according to an embodiment of the present invention showing the device in an open position not in place on a fuel tank spout and cap.

The various embodiments of the present invention will hereinafter be described in conjunction with the appended drawings.

DETAILED DESCRIPTION OF THE INVENTION

As discussed above, embodiments of the present invention relate to a locking device and more particularly to a fuel cap lock as used to improve the security of fuel storage.

Referring now to the drawings FIGS. 1-3, the Fuel Cap Lock comprises a keyed locking system 10 designed specifically for the diesel tanks of semi tractors, and intended not only to prevent a truck's diesel tanks from being accessed, but also to discourage would-be fuel thieves through the solid, heavy-duty hardware of the lock.

The Fuel Cap Lock 10 consists of a rectangular steel base plate 14, measuring about five inches by six inches and having a circular opening 12, which opening is approximately three inches in diameter in the center of the plate. The plate is also cut with a gap 16 in the six inch side of the plate which allows enough "play" in the plate that it can be threaded over and screwed onto the neck of the diesel-tank fill-pipe. Gap 16 is approximately one sixteenth of an inch wide. In an embodiment, circular opening 12 is threaded to allow base plate 14 to be screwed onto the neck of the fill pipe. The base plate 14, when installed in this manner, will then lie flat against the top surface of the tank 18.

A pair of steel hinges 20, are mounted to vertical hinge supports 18, which vertical hinge supports 18 are approximately two inches in height are welded to opposing sides base plate 14. Hinges 20 are fitted with a two-strap hasp lock 22 designed to close, overlap, and lock together over the tank's fuel cap, thus securing the cap and preventing its removal. Hasp lock 22 comprises hasp bottom portion 24, onto which is mounted keyed lock 26. Keyed lock 26 is capable of rotating ninety degrees when locked. Keyed lock 26 is oval, elliptical or otherwise elongate in geometry. Hasp lock 22 further comprises hasp top portion 28. Hasp top portion 28 comprises opening 32 which fits over keyed lock 26. Opening 32 is oval, elliptical or otherwise elongate to fit over keyed lock 26. When keyed lock 26 is locked, and thereby rotated ninety degrees, opening 32 on hasp top portion 28 prevents hasp top portion 28 from being opened, and thereby locks the fuel tank cap in place.

The steel base plate 14 of the Fuel Cap Lock is secured to the diesel fuel tank's fill-pipe to form a flat, form-fitting collar at its base. Any suitable means to secure the base plate to the fuel tank can be employed. The base plate can be welded in place. The base plate can be screwed down over the tank's fill pipe spout. The fuel cap 30 is then screwed onto the fill-pipe. With the fuel cap 30 in place, the steel base plate 14 cannot be removed. The diameter of the opening of the base plate is sized to accommodate the fuel tank fill pipe, but is too small for the fuel tank cap to pass through.

Then the hasp bottom portion 24 and hasp top portion 28 of the Fuel Cap Lock are brought over the fuel cap and locked together. With the Fuel Cap Lock in place, the fuel cap can only be accessed when the lock is opened with a key and the two opposing hasps are released and swung outward.

The Fuel Cap Lock, then, may provide secure, dependable, heavy-duty protection for the fuel caps of a semi tractor's diesel tanks. And because the Fuel Cap Lock hardware may be visible at some distance, the protection it affords could well dissuade would-be thieves from even approaching the truck equipped with it. The Fuel Cap Lock is preferably fabricated of long-lasting, high-quality materials, with welded joints for maximum strength, and a look of exceptional solidity. In these times of sky-high fuel prices and ever-increasing regulations, owner-operators and trucking firms cannot afford to see their expenses driven higher by the theft of the fuel they depend upon, and the Fuel Cap Lock, by providing convenient and affordable protection of the fueltanks, may thus protect the trucker's investment in fuel.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A fuel cap lock device for a fuel tank, the fuel tank having a threaded fill pipe and a fuel cap threadably mountable to the fill pipe, the fuel cap lock device comprising:
    a base plate having a threaded circular opening, the circular opening having threads and is sized to accommodate the fuel tank fill pipe,
    a first vertical hinge support secured to the base plate,
    a second vertical hinge support secured to the base plate opposite the first vertical hinge support,
    a first hinge mounted to the first vertical support,
    a second hinge mounted to the second vertical support,
    a hasp lock having a first strap and a second strap, the first strap mounted to the first hinge, the second strap mounted to the second hinge,
    wherein the base plate is threaded to the fill pipe prior to the fuel cap being threaded to the fill pipe;
    wherein the base plate is positionable against the fuel tank, and
    wherein upon mounting the fuel cap to the fill pipe, the straps overlap, and lock together over the fuel cap, thus securing the fuel cap and preventing its removal.

2. The fuel cap lock device of claim 1 and further comprising:
    a keyed lock mounted to the first strap,
    an opening formed in the second strap member the opening receiving the keyed lock,
    wherein a geometric shape of the opening corresponds to a geometric shape of the keyed lock.

3. The fuel cap lock device of claim 1 wherein the base plate is secured to the fuel tank to form a flat, form-fitting collar at a base of the fill-pipe.

4. The fuel cap lock device of claim 1 wherein the base plate is welded to the fuel tank.

5. The fuel cap lock device of claim 1 wherein the diameter of the circular opening of the base plate is sized to accommodate the fill pipe, but too small for the fuel tank cap to pass through.

6. The fuel cap lock device of claim 1, wherein the base plate measures about five inches by six inches and wherein the circular opening is approximately three inches in diameter in the center of the plate.

7. The fuel cap lock device of claim 1, wherein the base plate further comprises a slot formed between the circular opening and an edge of the base plate which allows the plate to be threaded over and screwed onto the fill-pipe.

8. The fuel cap lock device of claim 7, wherein the gap is approximately one sixteenth of an inch wide.

9. The fuel cap lock device of claim 1, wherein the vertical hinge supports are approximately two inches in height.

10. The fuel cap lock device of claim 1 wherein the base plate has a substantially rectangular configuration.

11. The fuel cap lock device of claim 2 and wherein the keyed lock has a geometry selected from the group consisting of oval, elliptical, and elongated, and further wherein a geometry of the opening is the same as the geometry of the keyed lock.

12. The fuel cap lock device of claim 2 wherein the keyed lock is capable of rotating ninety degrees when locked.

* * * * *